(12) United States Patent
Marriott et al.

(10) Patent No.: US 8,534,263 B2
(45) Date of Patent: Sep. 17, 2013

(54) BI-FUEL ENGINE INCLUDING SYSTEM AND METHOD FOR REDUCING COMPONENT TEMPERATURE

(75) Inventors: Craig D. Marriott, Clawson, MI (US); Uwe Dieter Grebe, Trebur (DE)

(73) Assignee: GM Global Technology Operations LLC

( * ) Notice: Subject to any disclaimer, the term of this patent is extended or adjusted under 35 U.S.C. 154(b) by 339 days.

(21) Appl. No.: 13/005,126

(22) Filed: Jan. 12, 2011

(65) Prior Publication Data

US 2012/0174891 A1 Jul. 12, 2012

(51) Int. Cl.
*F02M 43/00* (2006.01)

(52) U.S. Cl.
USPC ............ 123/299; 123/27 GE; 123/525

(58) Field of Classification Search
USPC ............ 123/1 A, 27 GE, 299, 300, 525, 527, 123/575, 577, 578
See application file for complete search history.

(56) References Cited

U.S. PATENT DOCUMENTS

| | | | | |
|---|---|---|---|---|
| 4,520,763 A * | 6/1985 | Lynch et al. | .......... | 123/447 |
| 4,907,565 A * | 3/1990 | Bailey et al. | .......... | 123/23 |
| 6,684,852 B2 * | 2/2004 | Wright et al. | .......... | 123/431 |
| 7,159,568 B1 * | 1/2007 | Lewis et al. | .......... | 123/431 |
| 2006/0112926 A1 * | 6/2006 | Date et al. | .......... | 123/299 |
| 2007/0256648 A1 * | 11/2007 | Sun et al. | .......... | 123/1 A |
| 2008/0156303 A1 * | 7/2008 | Bromberg et al. | .......... | 123/575 |
| 2009/0084349 A1 * | 4/2009 | Cohn et al. | .......... | 123/304 |
| 2010/0010725 A1 * | 1/2010 | Ito et al. | .......... | 701/103 |
| 2010/0024772 A1 * | 2/2010 | Lewis et al. | .......... | 123/446 |
| 2010/0024789 A1 * | 2/2010 | Lippa et al. | .......... | 123/672 |
| 2010/0070156 A1 * | 3/2010 | Cohn et al. | .......... | 701/103 |
| 2010/0147265 A1 * | 6/2010 | Bromberg et al. | .......... | 123/436 |
| 2010/0252004 A1 * | 10/2010 | Miersch-Wiemers | .......... | 123/495 |
| 2010/0263625 A1 * | 10/2010 | Cohn et al. | .......... | 123/299 |

FOREIGN PATENT DOCUMENTS

| | | |
|---|---|---|
| EP | 2009277 A1 | 12/2008 |
| WO | 2004097196 A1 | 11/2004 |

* cited by examiner

*Primary Examiner* — John Kwon
*Assistant Examiner* — Johnny Hoang
(74) *Attorney, Agent, or Firm* — Harness, Dickey & Pierce, P.L.C.

(57) ABSTRACT

A method may include injecting gasoline into a combustion chamber of an internal combustion engine from a direct injection gasoline fuel injector during a gasoline fuel mode of the engine. The method may also include combusting the gasoline in the combustion chamber to power the engine during the gasoline fuel mode. Further, the method may include injecting gaseous fuel from a gaseous fuel injection system into the combustion chamber during a gaseous fuel mode of the engine and combusting the gaseous fuel in the combustion chamber to power the engine during the gaseous fuel mode. The method may further include cooling the direct injection gasoline fuel injector during the gaseous fuel mode by injecting gasoline into the combustion chamber.

8 Claims, 1 Drawing Sheet

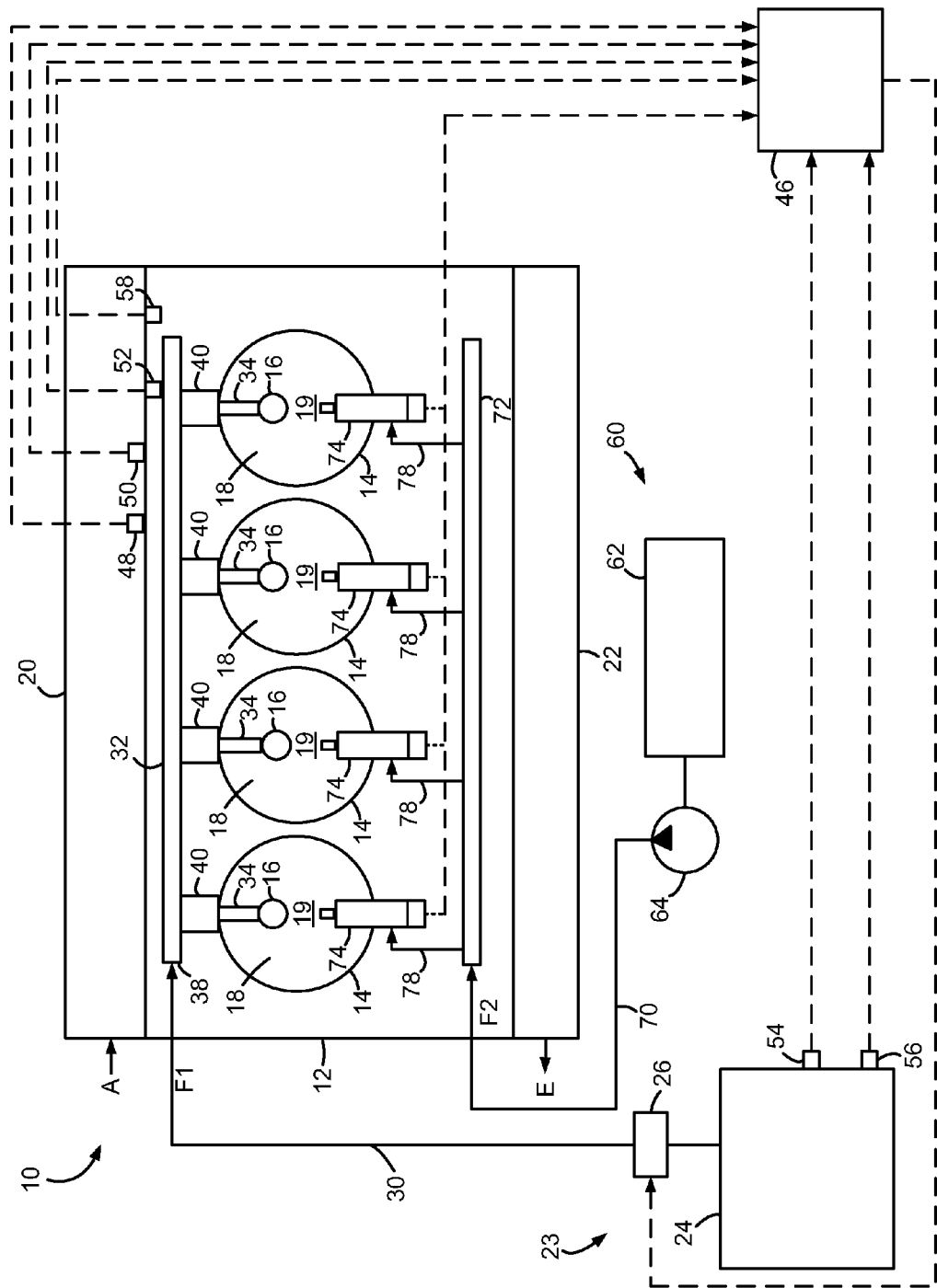

BI-FUEL ENGINE INCLUDING SYSTEM AND METHOD FOR REDUCING COMPONENT TEMPERATURE

FIELD

The present disclosure relates to engine assemblies, and more specifically to a system and method for reducing the temperature of component(s) of an engine assembly.

BACKGROUND

This section provides background information related to the present disclosure which is not necessarily prior art.

Internal combustion engines may combust a mixture of air and fuel in cylinders and thereby produce drive torque. Some engines may combust a gaseous fuel, such as liquefied petroleum gas or compressed natural gas. The temperature of some engine components during operation on a gaseous fuel may be greater than temperatures experience in engines combusting gasoline. This increased temperature experienced during gaseous fuel operation may result in an increased stress upon engine components.

SUMMARY

This section provides a general summary of the disclosure, and is not a comprehensive disclosure of its full scope or all of its features.

A method may include injecting gasoline into a combustion chamber of an internal combustion engine from a direct injection gasoline fuel injector during a gasoline fuel mode of the engine. The method may also include combusting the gasoline in the combustion chamber to power the engine during the gasoline fuel mode. Further, the method may include injecting gaseous fuel from a gaseous fuel injection system and gasoline from the direct injection gasoline fuel injector into the combustion chamber during a gaseous fuel mode of the engine. Additionally, the method may include combusting the gaseous fuel and gasoline in the combustion chamber to power the engine during the gaseous fuel mode.

A method may include injecting gasoline into a combustion chamber of an internal combustion engine from a direct injection gasoline fuel injector during a gasoline fuel mode of the engine. The method may also include combusting the gasoline in the combustion chamber to power the engine during the gasoline fuel mode. Further, the method may include injecting gaseous fuel from a gaseous fuel injection system into the combustion chamber during a gaseous fuel mode of the engine and combusting the gaseous fuel in the combustion chamber to power the engine during the gaseous fuel mode. The method may further include cooling the direct injection gasoline fuel injector during the gaseous fuel mode by injecting gasoline into the combustion chamber.

An engine assembly may include an engine structure, a gaseous fuel injection system, a direct injection gasoline fuel injector and a control module. The engine structure may define a combustion chamber. The gaseous fuel injection system may be in communication with the combustion chamber and may inject a gaseous fuel into the combustion chamber in a gaseous fuel mode. The direct injection gasoline fuel injector may be in communication with the combustion chamber and may inject gasoline into the combustion chamber in a gasoline fuel mode. The control module may control the direct injection gasoline fuel injector to inject gasoline into the combustion chamber during the gaseous fuel mode to cool the direct injection gasoline fuel injector.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

The FIGURE is a schematic illustration of an engine assembly according to the present disclosure.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Referring now to the FIGURE, an exemplary engine assembly 10 is schematically illustrated. The engine assembly 10 may form a bi-fuel engine assembly that is capable of running on either gasoline or a gaseous fuel, such as liquefied petroleum gas (LPG) or compressed natural gas (CNG). The engine assembly 10 may include an engine structure 12 defining cylinder bores 14 and injection ports 16, pistons 18, an intake manifold 20, an exhaust manifold 22, a gaseous fuel system 23 and a gasoline fuel system 60. The engine structure 12 may include an engine block that defines the cylinder bores 14 and a cylinder head that defines the injection ports 16. The cylinder bores 14 and the cylinder head may cooperate to define combustion chambers 19. While the engine assembly 10 is illustrated as including an inline four cylinder engine, it is understood that the present disclosure applies equally to engines having any number of cylinders and arrangements including, but not limited to, inline and V-engines.

The pistons 18 may be disposed within the cylinder bores 14 for reciprocal displacement therein. The intake manifold 20 may be in communication with the cylinder bores 14 to provide airflow (indicated by arrow A) into the cylinder bores 14. The exhaust manifold 22 may be in communication with the cylinder bores 14 to transport exhaust gases (indicated by arrow E) away from the cylinder bores 14.

The gaseous fuel system 23 may form an LPG or CNG fuel assembly including a gaseous fuel tank 24, a pressure regulation device 26, a gaseous fuel supply line 30, a gaseous fuel rail 32 and gaseous fuel injectors 34. The gaseous fuel tank 24 may form an LPG tank for storing LPG therein. Alternatively, the gaseous fuel tank 24 may form a CNG tank for storing CNG therein. The pressure regulation device 26 may generate a gaseous fuel flow (indicated by arrow F1) from the gaseous fuel tank 24 through the gaseous fuel supply line 30.

The gaseous fuel rail 32 may include an inlet 38 in communication with the gaseous fuel supply line 30 and injection passageways 40 in communication with the inlet 38. The gaseous fuel injectors 34 may be in communication with the injection passageways 40. The gaseous fuel rail 32 may receive gaseous fuel flow from the pressure regulation device 26 and distribute gaseous fuel to the gaseous fuel injectors 34. The gaseous fuel injectors 34 may provide gaseous fuel to the cylinder bores 14. By way of non-limiting example, the gaseous fuel injectors 34 may inject gaseous fuel directly into the cylinder bores 14. Alternatively, the gaseous fuel injectors 34 may inject gaseous fuel into the injection ports 16 and reciprocal movement of the pistons 18 within the cylinder bores 14 may create a vacuum that draws the gaseous fuel from injection ports 36 into the cylinder bores 14.

The gasoline fuel system 60 may include a gasoline fuel tank 62, gasoline fuel pump 64, a gasoline fuel rail 72, gasoline fuel injectors 74, a main gasoline fuel supply line 70 and secondary gasoline fuel supply lines 78. The gasoline fuel pump 64 may be in communication with the gasoline fuel tank 62 and may provide a gasoline fuel flow (indicated by arrow F2)/pressurized gasoline fuel supply to the gasoline fuel rail 72 via the main gasoline fuel supply line 70. The gasoline fuel rail 72 may provide the pressurized gasoline fuel to gasoline fuel injectors 74 via the secondary gasoline fuel supply lines 78.

The gasoline fuel injectors 74 may each include an actuation assembly in communication with a control module 46. In the present non-limiting example, the gasoline fuel injectors 74 may form direct injection gasoline fuel injectors where gasoline is injected directly into the combustion chambers 19.

The engine assembly 10 may further include a control module 46, a coolant temperature sensor 48, an oil temperature sensor 50, a gaseous fuel rail pressure sensor 52, a gaseous fuel tank temperature sensor 54, and a gaseous fuel tank pressure sensor 56. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. The control module 46 may control operation of the pressure regulation device 26, as well as gasoline fuel pump 64 and gasoline fuel injectors 74. By way of non-limiting example, the control module 46 may control operation of the pressure regulation device 26 and other components via pulse width modulation (PWM) of signals sent thereto.

The coolant temperature sensor 48 and the oil temperature sensor 50 may provide signals to the control module 46 that respectively indicate the temperature of oil in the engine structure 12 and the temperature of coolant in the engine structure 12. The gaseous fuel rail pressure sensor 52, the gaseous fuel tank temperature sensor 54, and the gaseous fuel tank pressure sensor 56 may provide signals to the control module 46 that respectively indicate the pressure of gaseous fuel in the gaseous fuel rail 32, the temperature of gaseous fuel in the gaseous fuel tank 24, and the pressure of gaseous fuel in the gaseous fuel tank 24. In embodiments, engine assembly 10 may further include an additional temperature sensor 58 (such as a combustion chamber temperature sensor or a gaseous/gasoline fuel injector temperature sensor) to provide signals to the control module 46 that indicate the temperature of the engine structure 12 and/or its components (gasoline fuel injectors 74, gaseous fuel injectors 34, etc.), combustion chamber 19, or other components of engine assembly 10.

As described above, engine assembly 10 may form a bi-fuel engine assembly that is capable of operating on either gasoline (in a gasoline fuel mode) or a gaseous fuel (in a gaseous fuel mode). In the gasoline fuel mode, gasoline from gasoline fuel tank 62 may be injected into the combustion chambers 19. The gasoline may then be combusted in the combustion chambers 19 to reciprocate the pistons 18 to power the engine assembly 10. Similar to the gasoline fuel mode, in the gaseous fuel mode gaseous fuel from gaseous fuel tank 24 may be injected into the combustion chambers 19. The gaseous fuel may then be combusted in the combustion chambers 19 to reciprocate the pistons 18 to power the engine assembly 10. The occurrence of injecting fuel (gasoline or gaseous fuel) into the combustion chamber 19 and combusting the fuel may be referred to as a combustion cycle.

During operation in the gaseous fuel mode, the temperature of the engine structure 12 and/or its components (gasoline fuel injectors 74, gaseous fuel injectors 34, etc.) may exceed that experienced when operating in the gasoline fuel mode. During the gaseous fuel mode, the control module 46 may control the gasoline fuel injectors 74 to inject gasoline into the combustion chambers 19 during a combustion cycle or a subset of all combustion cycles in order to cool the engine structure 12, its components (gasoline fuel injectors 74, gaseous fuel injectors 34, etc.) and/or other components of the engine structure 12. For example only, during operation in the gaseous fuel mode, the temperature of gasoline fuel injectors 74 may exceed that experienced when operating in the gasoline fuel mode and the control module 46 may control the gasoline fuel injectors 74 to inject gasoline into the combustion chambers 19 during a combustion cycle or a subset of all combustion cycles in order to cool the gasoline fuel injectors 74.

Additionally or alternatively, during operation in the gasoline fuel mode, the temperature of the engine structure 12 and/or its components (gasoline fuel injectors 74, gaseous fuel injectors 34, etc.) may exceed that experienced when operating in the gaseous fuel mode. During the gasoline fuel mode, the control module 46 may control the gaseous fuel injectors 34 to inject gasoline into the combustion chambers 19 during a combustion cycle or a subset of all combustion cycles in order to cool the engine structure 12, its components (gasoline fuel injectors 74, gaseous fuel injectors 34, etc.) and/or other components of the engine structure 12. For example only, during operation in the gasoline fuel mode, the temperature of gaseous fuel injectors 34 may exceed that experienced when operating in the gaseous fuel mode and the control module 46 may control the gaseous fuel injectors 34 to inject gaseous fuel into the combustion chambers 19 during a combustion cycle or a subset of all combustion cycles in order to cool the gaseous fuel injectors 34.

Operating a bi-fuel engine assembly, such as engine assembly 10, may include determining the mode of operation, e.g., the gaseous fuel mode or the gasoline fuel mode. While the discussion below describes the injection of gasoline during operation in gaseous fuel mode, e.g., to cool the engine structure 12 and/or its components (gasoline fuel injectors 74, gaseous fuel injectors 34, etc.), one skilled in the art will appreciate that the present disclosure contemplates the injection of gaseous fuel during operation in gasoline fuel mode, e.g., to cool the engine structure 12 and/or its components (gasoline fuel injectors 74, gaseous fuel injectors 34, etc.).

In the gasoline fuel mode, the control module 46 may control the gasoline fuel system 60 (such as, gasoline fuel injectors 74) to inject gasoline into the combustion chambers 19. The control module 46 may then control engine assembly 10 to combust the gasoline within the combustion chambers 19 to power the engine. In the gaseous fuel mode, the control module 46 may control the gaseous fuel system 23 to inject gaseous fuel into the combustion chambers 19. The control module 46 may then control engine assembly 10 to combust the gaseous fuel within the combustion chambers 19 to power the engine.

In the gaseous fuel mode the control module 46 may also determine if cooling of the engine structure 12 and/or its components (gasoline fuel injectors 74, gaseous fuel injectors 34, etc.) is desired. The control module 46 may cool the engine structure 12 (such as direct injection gasoline fuel injectors 74) by injecting gasoline into the combustion chambers 19 during each combustion cycle, or a subset of combustion cycles. For example only, the control module 46 may control the direct injection gasoline fuel injectors 74 to inject gasoline in one of every X combustion cycles, where X may be any number equal to or greater than one. In the event that gasoline and gaseous fuel are both injected into the combustion chambers 19, the gasoline and gaseous fuel may be combusted to power the engine.

The control module 46 may attempt to minimize the amount of gasoline utilized by engine assembly 10 during the gaseous fuel mode. Additionally, there may be a minimum amount of gasoline (minimum injectable amount) that each of the direct injection gasoline fuel injectors 74 is capable of injecting. Under certain operating conditions, the engine structure 12 and/or its components (gasoline fuel injectors 74, gaseous fuel injectors 34, etc.) may be cooled by utilizing very little (or even no) gasoline. In the event that control module 46 determines that the amount of gasoline to be injected to cool engine structure 12 and/or its components (gasoline fuel injectors 74, gaseous fuel injectors 34, etc.) is below the minimum injectable amount, the control module 46 may control the direct injection gasoline fuel injectors 74 to skip one or more combustion cycles, i.e., inject gasoline in one of every X combustion cycles, where X is a number greater than one. For example only, in the gaseous fuel mode control module 46 may control the direct injection gasoline fuel injectors 74 to inject gasoline into the combustion chamber 19 during a first combustion cycle and to not inject gasoline into the combustion chamber 19 during a second combustion cycle. As a further non-limiting example, the temperature of the engine structure 12 and/or its components (gasoline fuel injectors 74, gaseous fuel injectors 34, etc.) during the first combustion cycle may be higher than during the second combustion cycle.

The amount of gasoline to be injected for cooling purposes, and/or the subset of combustion cycles during which to inject gasoline, may be based on a number of different operating parameters. These parameters may include, but are not limited to, the temperature of one or more of the combustion chambers 19, the temperature of the engine structure 12 and/or the temperature of the direct injection gasoline fuel injectors 74. Further, the amount of gasoline to be injected for cooling purposes, and/or the subset of combustion cycles during which to inject gasoline, may be related to the operating speed of the engine ("engine speed") and/or the engine load. Engine load is an estimation of how hard the engine assembly 10 is working and may be based on a number of factors including, but not limited to, engine speed, throttle position and air flow. The temperature of the engine structure 12 and/or its components (gasoline fuel injectors 74, gaseous fuel injectors 34, etc.) may increase as engine speed/load increases, which may increase the need for cooling. For example only, gasoline may be injected into the combustion chamber(s) 19 when the engine speed is greater than a predetermined threshold. Additionally or alternatively, gasoline may be injected into the combustion chamber(s) 19 when the engine load is greater than a predetermined threshold.

The amount of gasoline to be injected for cooling purposes, and/or the subset of combustion cycles during which to inject gasoline, may also be based on maintaining the temperature of the engine structure 12 (such as direct injection gasoline fuel injectors 74) below a predetermined threshold. For example only, the amount of gasoline to be injected for cooling purposes, and/or the subset of combustion cycles during which to inject gasoline, may be based on maintaining the temperature of the direct injection gasoline fuel injectors 74 below 250 degrees Celsius.

The amount of gasoline to be injected for cooling purposes, and/or the subset of combustion cycles during which to inject gasoline, may be modeled or determined experimentally and then programmed into the control module 46. Additionally, or alternatively, the amount of gasoline to be injected for cooling purposes, and/or the subset of combustion cycles during which to inject gasoline, may be based on signals received from sensors associated with engine assembly 10 (such as, coolant temperature sensor 48, oil temperature sensor 50, gaseous fuel rail pressure sensor 52, gaseous fuel tank temperature sensor 54, gaseous fuel tank pressure sensor 56, temperature sensor 58, engine speed sensor (not shown), throttle position sensor (not shown) and Manifold Absolute Pressure sensor (not shown)).

What is claimed is:

1. A method comprising:
   injecting gasoline into a combustion chamber of an internal combustion engine from a direct injection gasoline fuel injector during a gasoline fuel mode of the internal combustion engine;
   combusting the gasoline in the combustion chamber to power the engine during the gasoline fuel mode;
   injecting a gaseous fuel from a gaseous fuel injection system and gasoline from the direct injection gasoline fuel injector into the combustion chamber during a gaseous fuel mode of the engine; and
   combusting the gaseous fuel and gasoline in the combustion chamber to power the engine during the gaseous fuel mode, wherein when it is determined that an amount of gasoline required to cool the direct injection gasoline fuel injector is below a minimum injectable amount, gasoline is injected into the combustion chamber during only one combustion cycle out of a predetermined number of combustion cycles in the gaseous fuel mode.

2. The method of claim 1, wherein the predetermined number of combustion cycles is determined based upon an engine speed.

3. The method of claim 1, wherein the predetermined number of combustion cycles is determined based upon an engine load.

4. A method comprising:
injecting gasoline into a combustion chamber of an internal combustion engine from a direct injection gasoline fuel injector during a gasoline fuel mode of the internal combustion engine;
combusting the gasoline in the combustion chamber to power the engine during the gasoline fuel mode;
injecting a gaseous fuel from a gaseous fuel injection system into the combustion chamber during a gaseous fuel mode of the engine;
combusting the gaseous fuel in the combustion chamber to power the engine during the gaseous fuel mode; and
cooling the direct injection gasoline fuel injector during the gaseous fuel mode by injecting gasoline into the combustion chamber, wherein when it is determined that an amount of gasoline required to cool the direct injection gasoline fuel injector is below a minimum injectable amount, gasoline is injected into the combustion chamber during only one combustion cycle out of a predetermined number of combustion cycles in the gaseous fuel mode.

5. The method of claim 4, wherein the predetermined number of combustion cycles is determined based upon an engine speed.

6. The method of claim 4, wherein the predetermined number of combustion cycles is determined based upon an engine load.

7. An engine assembly comprising:
an engine structure defining a combustion chamber;
a gaseous fuel injection system in communication with the combustion chamber that injects a gaseous fuel into the combustion chamber in a gaseous fuel mode;
a direct injection gasoline fuel injector in communication with the combustion chamber that injects gasoline into the combustion chamber in a gasoline fuel mode; and
a control module that controls the direct injection gasoline fuel injector to inject gasoline into the combustion chamber during the gaseous fuel mode to cool the direct injection gasoline fuel injector, wherein when it is determined that an amount of gasoline required to cool the direct injection gasoline fuel injector is below a minimum injectable amount, gasoline is injected into the combustion chamber during only one combustion cycle out of a predetermined number of combustion cycles in the gaseous fuel mode.

8. The engine assembly of claim 7, wherein the predetermined number of combustion cycles is determined based upon an engine load.

* * * * *